A. J. KLONECK.
CURRENT AMPLIFIER.
APPLICATION FILED MAY 29, 1914.
1,264,813.
Patented Apr. 30, 1918.
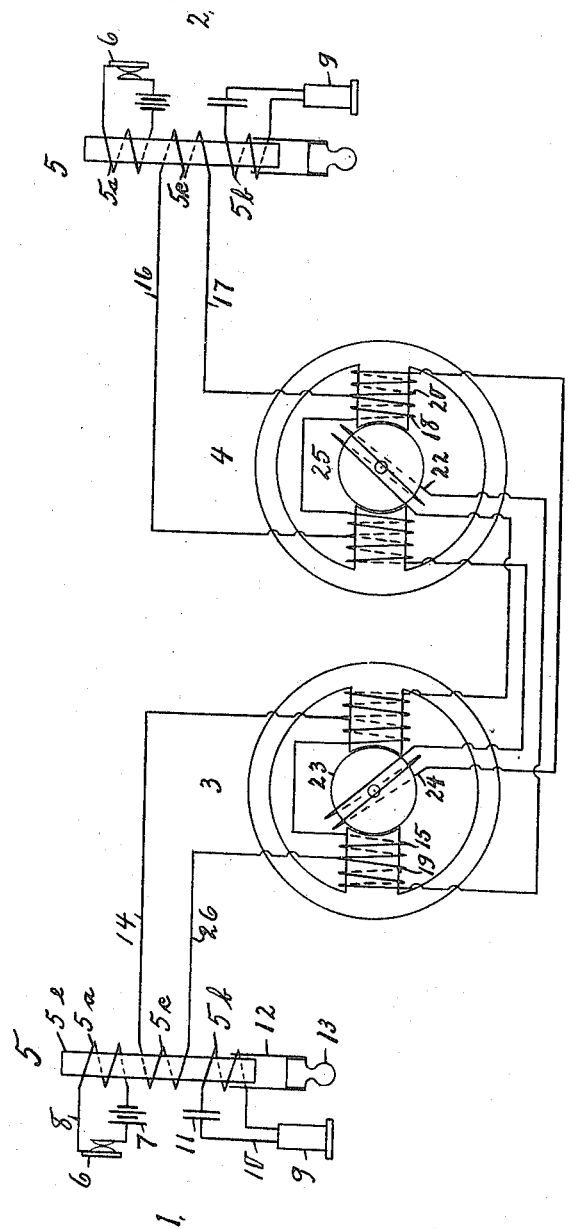
WITNESSES:
Norbert Landau
Martin Poppelauer
INVENTOR.
August J. Kloneck,
BY
ATTORNEY.

UNITED STATES PATENT OFFICE.

AUGUST J. KLONECK, OF NEW YORK, N. Y.

CURRENT-AMPLIFIER.

1,264,813.

Specification of Letters Patent.  Patented Apr. 30, 1918.

Application filed May 29, 1914. Serial No. 841,782.

*To all whom it may concern:*

Be it known that I, AUGUST J. KLONECK, a citizen of the United States, residing at New York, in the county and State of New York, have invented new and useful Improvements in Current-Amplifiers, of which the following is a specification.

My invention relates to amplifiers for electric currents and has for its object to provide a diagram of electrical circuits and generators for the purpose of amplifying oscillatory currents between signaling stations; whereby transmitted current variations are repeated and reinforced for the receiving apparatus without a reaction of the amplified currents upon the transmitting station apparatus.

Another object of my invention is to provide a repeating coil, which permits of sending the entire transmitting current to another signal station, while the strength of the received currents may be varied as convenient.

A further object of my invention is to provide an electric generator without commutator, bars and oscillating poles for the purpose of generating continuous electric current, thus obviating the detrimental current variations by a sparking of the brush collectors and of frequency current generators.

Referring to the drawing, forming a part of this specification which shows my invention diagrammatically and in which like numerals of reference indicate similar parts in the view, the numerals 1 and 2 designate two stations, equipped for telephone service, whereby call-bells, switch-hooks and other parts are omitted as well known in the art and not necessary for a complete understanding of the device. The numerals 3 and 4 denote two electrical generators, forming an amplifying relay for the oscillating current, while the numeral 5 represents repeating coils. The latter have three separate coils, of which, one coil forms a circuit with a transmitter 6 and battery 7 by means of wires 8; another coil $5^b$ of the repeating coil 5 is connected to a receiver 9 by means of wires 10, which may include a condenser 11. A diamagnetic tube 12, such as brass is provided movable between core $5^e$ and the winding $5^b$ of the repeating coil 5, to vary the amount of induced current in the winding and to attain any desired loudness of the receiver. The movement of tube 12 may be accomplished with a handle 13 or with other suitable means, or it may be connected to a rod extending through the casing of the inclosed apparatus for the damping of the currents. The third coil $5^c$ of the induction coil 5 is connected with the line wires 26 and 14 to the relay station 3. The station 2 consists of similar parts, as described in connection with the first station, and the winding $5^c$ of its induction coil 5 is connected with wires 16 and 17, to the field coil 18 of generator 4.

An amplifying relay is interposed between the signaling stations and embraces two current generators 3 and 4 and suitable electrical connections among the various parts of the set, which permit the amplifying of current from a transmitting to a receiving apparatus but prevent a reaction of the amplified currents upon the transmitting apparatus. For this purpose, I provide the field magnets of an amplifying generator with a differential coil and connect the same to the main circuit in a manner, so that the current from a transmitting apparatus surges in the same direction through the differential coil as through the main field coil and thus energizes the generator; but an amplified current from this generator surges through a differential coil in the opposite direction to that in the main coil, which prevents an energizing of the amplifying generator. Thus, the transmitting apparatus 1, for instance, is connected by wires 14 and 26 to both field coils; the differential coil 15 and the main coil 19. The latter is in series with the armature or generating coil 22 of another generator 4, which serves to amplify the electric current from the transmitting apparatus of station 2. The amplified current which is produced in coil 24 of generator 3, surges through a main coil 20 and to the receiving apparatus of station 2, and further through a differential coil 18. It will be seen from the accompanying drawing that a current from an armature or amplifying coil surges in opposite directions through both field coils, while the current from any transmitting apparatus surges in the same direction through the field coils. Thus, in the first case, the field magnet of a generator is not energized on account of the opposed current in both field coils, while in the latter case both coils of the field magnet assist each other in the energizing of the field magnet. The result is the same whether station 1 or 2 is signaling, whereby the amplifying relay permits the amplified message to be obtained at the other station without changing any connection.

For the purpose of eliminating any detrimental pulsation in the generation of the amplified current, I employ a novel generator without collecting rings or frequency producing poles. These generators are provided with stationary field and amplifying coils, the amplifying coils of which are arranged, so as to be cut by lines of residual magnetic force of a rotating armature bobbin, which is induced in the latter through the field coils of a generator. The arrangement of the amplifying coils depend upon the capability of the armature bobbin to retain a magnetic charge. In practice, the amplifying coil may be arranged in a plane with the field magnets and at an angle with the field coils it may further be placed with its wires between the field poles, or above the same, or it may have a portion upon the field magnets.

In providing the repeating coil, the adjustment of the same may be varied by arranging the coil or core so as to be movable with respect to each other instead of the arrangement described, and in forming the generators, the same may be embodied in any convenient casing; further I may employ as many amplifier sets between two stations as desired and it will be observed that my invention is not limited to the exact form of the parts herein described, and it is evident that various changes and modifications may be made of the same without departing from the spirit of my invention.

Having fully described my invention, I claim as new and desire to protect by Letters Patent:—

1. A current amplifier comprising two amplifying generators having a rotatable armature, two field coils and an amplifying coil, and two circuits comprising a signaling apparatus, a field coil of one generator and the amplifying coil of a second generator, a second field coil for the generator connected in multiple with the other field coil and the amplifying coil of the second generator, said field coils being similarly wound with respect to a transmitting apparatus and oppositely wound with respect to the amplifying coil of the other amplifying generator, all, substantially as set forth.

2. The combination, in a current amplifying set between two stations, of two dynamo generators in the set comprising two exciting coils for the generators, one for each generator and in the circuit of each station, of a differential coil for each generator, and an armature coil for each generator, and a circuit embracing the armature coil of one generator, the exciting coil of the other generator and a station apparatus and a bridging circuit comprising said differential coil of the other generator, said differential coil being oppositely wound with respect to the exciting coil, for the purpose set forth.

3. An amplifying relay comprising two current generators, stationary coils and field magnets and a movable armature for each generator, of two field coils for each field, said field coils being connected in multiple with respect to line conductors and in series with respect to an amplifying means of a second generator, for the purpose specified.

4. The combination, in a current amplifying relay for signaling stations, of two current generators, two armatures, field magnets and two coils for each magnet, the coils being oppositely wound and in series with the current generating means of the other relay generator and in multiple with respect to one another and a signaling station apparatus, all, for the purpose set forth.

5. A relay set for amplifying feeble currents, said relay set comprising two dynamo generators, an armature, armature coils and field coils for each generator, of two field coils for each field, said field coils being oppositely wound with respect to the other amplifying generator, and in the same direction with respect to the transmitting station conductors, all, for the purpose set forth.

6. The combination, of transmitting and receiving apparatus and a relay, said relay comprising electric generators having a movable armature, two field coils for energizing the armature, said field coils being connected in multiple with respect to one another and a transmitting apparatus and energizing the relay generator for the generating of an amplified current to a receiving apparatus, and said coils being connected in series with regard to another transmitting apparatus and not exciting the generator for said receiving apparatus, all, for the purpose specified.

7. The combination with a relay for amplifying electric currents, of a generator having a rotating armature, current amplifying coils and field magnets, main and differential coils for the field magnets, said field coils being similarly wound with respect to one transmitting station apparatus and oppositely wound with respect to another transmitting apparatus, and the amplifying coils of said generator connected to the receiving apparatus, for the purpose specified.

8. A current amplifying relay between signaling stations, comprising an electric generator having stationary field magnets and field coils, and a rotating armature, said field coils comprising series and differential coils and amplifying coils, as and for the purpose set forth.

9. An amplifying relay for electric currents, comprising a normally direct current generator having non-revolving field and current generating coils, a non-revolving differential coil for the field and a revolving armature, all substantially as set forth for the purpose specified.

10. In a current amplifier the combination, of a dynamo having field, armature and coils, the field coils of which consist of series and shunt coils, said shunt coils being connected in series with said series coils, and adapted to neutralize each other.

11. In a current amplifier, of a dynamo having field and armature and coils, the field coils comprising series and shunt coils, said series coils being connected in multiple with respect to said shunt coils, and adapted to co-energize said field.

12. The combination, of an induction coil, a line circuit and a substation, having transmitting and receiving circuits and apparatus; said induction coil having a magnetic core and three coils, said coils are arranged in separate circuits with said transmitting and receiving apparatus and said line circuit, and means for varying the intensity of signals for said receiving apparatus, said means consisting of a metallic non magnetic screen movably arranged within said coil for the receiving apparatus.

In witness whereof I hereunto subscribe my name.

AUGUST J. KLONECK.

Witnesses:
 NORBERT LANDAU,
 MARTIN POPPELAUER.